April 23, 1935.  J. A. KENNEDY  1,999,051
FLEXIBLE SHAFT
Filed March 31, 1932   2 Sheets—Sheet 1
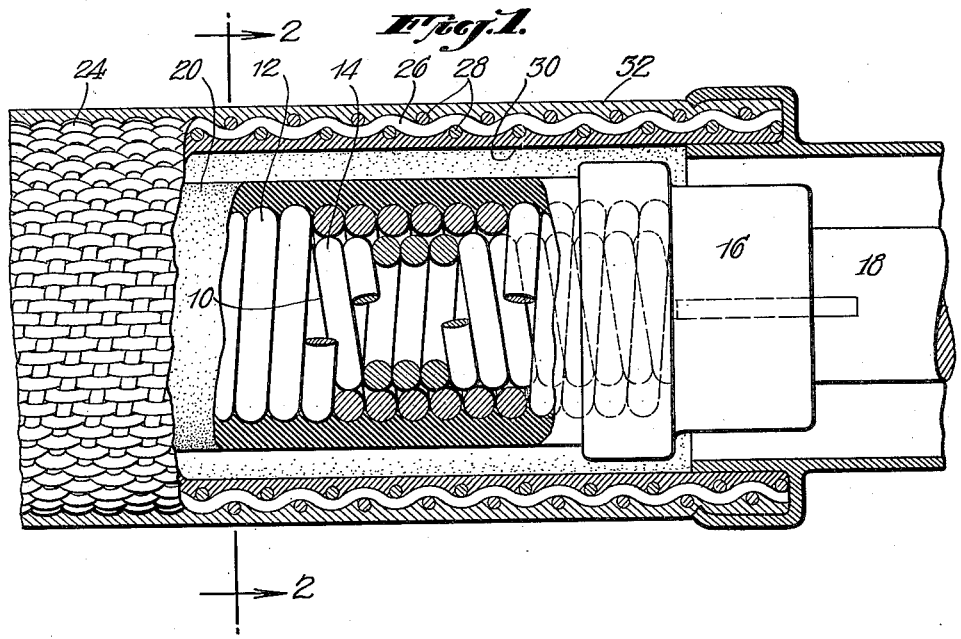
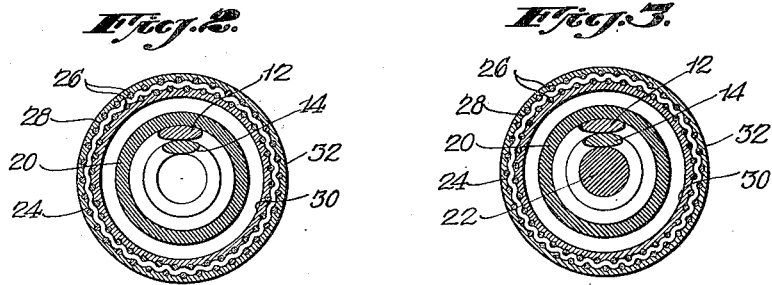
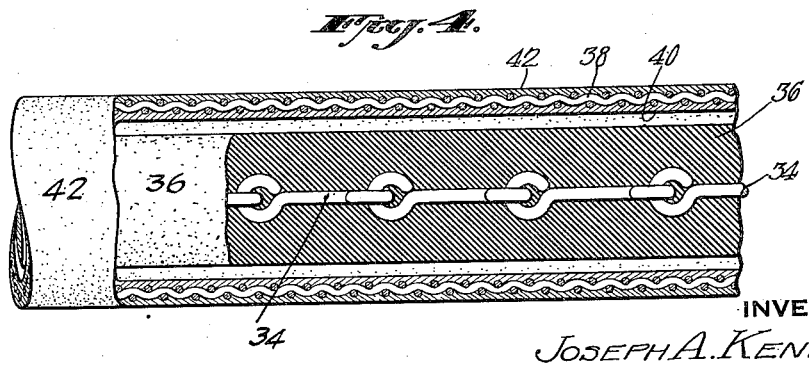
INVENTOR
JOSEPH A. KENNEDY.
BY HIS ATTORNEYS April 23, 1935.  J. A. KENNEDY  1,999,051
FLEXIBLE SHAFT
Filed March 31, 1932   2 Sheets-Sheet 2
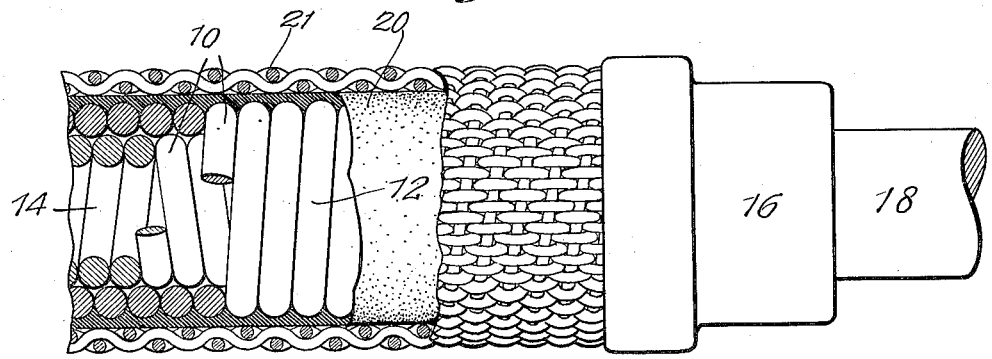
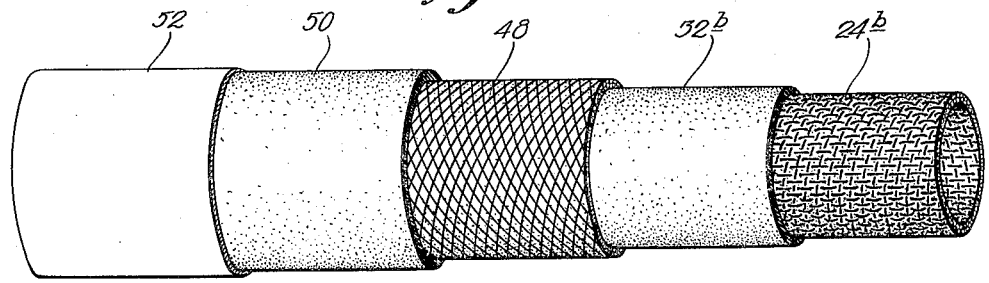
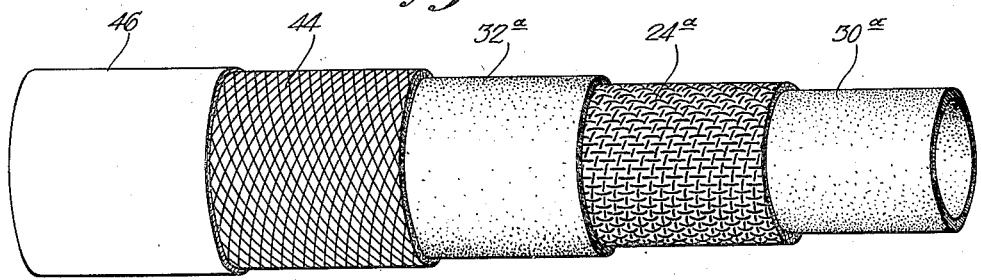
INVENTOR
JOSEPH A. KENNEDY.
BY HIS ATTORNEYS Patented Apr. 23, 1935

1,999,051

UNITED STATES PATENT OFFICE 1,999,051

FLEXIBLE SHAFT

Joseph A. Kennedy, Pawtucket, R. I., assignor to Anaconda Wire & Cable Company, New York, N. Y., a corporation of Delaware Application March 31, 1932, Serial No. 602,241

6 Claims. (Cl. 64—30)

This invention relates to improvements in flexible shafts such as used for transmitting power to speedometers on automobiles, or other like mechanisms.

The invention will be fully apparent from the following specification when read in connection with the accompanying drawings, in which—

Fig. 1 is an enlarged view partly in elevation and partly in section illustrating one embodiment of the invention;

Fig. 2 is a transverse section on line 2—2 of Fig. 1;

Fig. 3 is a view similar to Fig. 2 illustrating a modification;

Fig. 4 is a view illustrating a further modification;

Fig. 5 is a detail view showing a rubber covered flexible shaft having a jacket secured directly thereto;

Figs. 6 and 7 are detail views of a slightly modified form of flexible shaft housing.

Referring in detail to the drawings, 10 represents the flexible shaft as a whole. This may take different forms, as shown, for example, in Figs. 1 and 4, respectively. In the form of flexible shaft shown in Fig. 1, there is an outer helical member 12 of wire which encloses an inner helical member 14. Both of these members are secured to a suitable fitting 16, which is adapted to be engaged with a drive shaft 18, the fitting being keyed, or otherwise secured to the shaft. It will be understood that the driven end of the flexible shaft may have a fitting similar to 16, or any other suitable form of fitting for connection with the driven member.

A characteristic feature of the invention resides in securing to the flexible transmission elements of the flexible shaft a body of rubber. In Fig. 1, this body of rubber is indicated at 20. As shown, it envelops the flexible transmission elements. This rubber may be secured to the transmission elements in any manner known in the art. The chief function of the rubber body is to prevent objectionable noises and undue whipping of the shaft. It also may serve as an enclosure for an interior lubricant. Instead of lubricating the interior of the shaft, however, in some cases, I may fill the interior of the helical members with a body of soft flexible rubber, as indicated at 22 in Fig. 3. The filling 22 may be encased in a woven or braided jacket. And similarly the body of rubber 20 may in some cases be encased in a woven jacket.

As shown in detail in Fig. 5, the rubber body 20 secured to the shaft may be encased with a jacket or cover 21 of rubberized braided, or woven strands of cotton or the like. The strands of this cover 21 may be impregnated with latex or the jacket may be coated with rubber by passing it through a bath of latex.

The flexible shaft is preferably enclosed in a relatively fixed, yet flexible, sheath, indicated as a whole at 24. Various forms of sheaths or housings may be used. It is desirable, however, that they be of a nature which will prevent noise, also that they will exclude foreign matter such as oil, dirt and water from the flexible shaft. A very satisfactory enclosing sheath for use in combination with the rubber enveloped flexible transmission element may comprise interwoven warp and filling strands. Alternatively, the outer sheath may be of metallic form. In the embodiment illustrated, the longitudinal warp strands 26 are of cotton or similar textile material. These are interwoven with helical filling strands 28, preferably formed of twisted paper treated with hide glue, or with hide glue and rubber cement. Such a structure and treatment provides a sheath of sufficient flexibility for the purpose and yet one which is relatively stiff, so as to resist collapse and hence tend to hold its shape. The inner wall of the enclosing sheath may have a coating of lacquer thereon, as indicated at 30. Or, in place of lacquer, or, in addition to the lacquer, there may be a layer of material having lubricating characteristics with respect to rubber. Suitable material for this inner coating may consist of talcum powder, fuller's earth, soapstone, mica flakes, or chalk. These may be caused to adhere to the lacquer coating, or can be applied in a waxy base to the interior of the outer sheath. Over the outer surface of the sheath 24, I preferably provide an oil and water resistant coating. This may take the form of a layer of lacquer, as indicated at 32 in Figs. 1 and 2. Or, 32 may be considered as a layer of rubber over interwoven warp and filling strands of cotton or the like impregnated with rubber.

In the modification illustrated in Fig. 4, the flexible shaft comprises a series of connected links 34. These are embedded in a body of flexible soft rubber 36. The relatively fixed flexible sheath shown in this instance may consist of a woven fabric, indicated diagrammatically at 38. This may be considered as either a braided or woven fabric, the strands of which were treated with suitable stiffening material such as hide glue, or hide glue and rubber cement. In this modification, the sheath will have an inner coating 40 of material having lubricating qualities. This may be applied as a thin layer of rubber cement loaded with soapstone, fuller's earth, or the like, so as to offer a minimum amount of friction to the rubber body 36, which envelops the links 34. The exterior of the sheath 38 will have a layer 42 of pyroxylin lacquer, or some similar material. It is also contemplated that the protective sheaths 24 and 38 may have their fibrous strands impregnated with liquid asphaltum and the paper strands may be treated with dextrine, starches, silicate of soda, hide glue, or rubber cement. Such treatment is desirable in a sheath of this character because it endows the same with stiffness and it increases its resistance to wear, which is of importance in a relatively fixed sheath, used to house a rotating flexible member.

The outer sheaths having the inner rubber lined, varnished or lacquered coats loaded with powdered lubricants provide an enclosing means peculiarly well suited for use in combination with a flexible shaft encased in rubber. This combination is practically noiseless and also minimizes friction. It is contemplated, in some cases, to merely coat the interior of the housing with lacquer or varnish. This will present a relatively hard, bright or shiny surface having a relatively low coefficient of friction as compared to the rubber body enclosing the flexible shaft.

The housing for the flexible shaft above described is of single ply fabric. It is contemplated, in some cases, making the housing of various plies of fabric, some of which are woven, others being braided. Such alternative forms of housings are illustrated in Figs. 6 and 7. Referring to Fig. 6, I have here shown a housing for a flexible shaft. This housing comprises an inner woven tube 24$^a$ composed of longitudinal warp strands and helical filling strands. This tube will have an inner coating of rubber, as indicated at 30$^a$ and an exterior rubber coating, indicated at 32$^a$. Over the rubber coating 32$^a$, there will be a braided covering 44 formed of rubberized fabric strands. This covering will be oil and waterproofed by means of a layer of lacquer, such as indicated at 46.

In the modified form of housing shown in Fig. 7, I provide an inner woven tube 24$^b$, preferably treated with varnish, so as to render it substantially oil-proof. Over this tube 24$^b$, there is a layer of rubber 32$^b$, which in turn is enclosed in a braided jacket 48, whose strands are saturated or impregnated with rubber and over this jacket, there is a layer of rubber 50, which in turn is covered with a film or coating of lacquer, as indicated at 52. This lacquer coating is adapted to protect the rubber layer and to resist the destructive action of oil, water, mud and other foreign matter thereon, with which speedometer shaft housings are frequently spattered in use. I also contemplate using a housing, as illustrated in Fig. 7, in which the varnish treatment of the inner woven tube 24$^b$ is dispensed with.

While I have described in considerable detail certain specific embodiments of the invention herein illustrated it is not to be construed that I am limited thereto since various modifications and substitutions of equivalents may be made by those skilled in the art without departing from the invention as defined in the appended claims.

What I claim is:—

1. A flexible shaft comprising a rotatable flexible power transmitting element wholly surrounded by a cushion which is movable therewith and a protective jacket of interconnected strands secured to said cushion and rotatable with said element.

2. A flexible shaft comprising a rotatable flexible power transmitting element surrounded by a rubber cushion which is movable therewith and a protective jacket of interconnected rubberized strands secured to said cushion and rotatable with said element.

3. A flexible shaft comprising a rotatable helical power transmitting element having a rubber cushion secured directly to the exterior thereof and a protective jacket of interwoven strands secured to said cushion, said jacket being impregnated with rubber latex.

4. A flexible shaft comprising a rotatable flexible power transmitting element having a rubber cushion secured directly to the exterior thereof, a protective jacket of interwoven strands secured to said cushion, said jacket having an outer coating of rubber secured thereto.

5. A flexible shaft comprising a solid metal helical spring-like power transmitting element constricted about a central rubber cushion, the pitch of any given convolution of said element being materially less than the outside diameter of said spring-like element.

6. A flexible shaft comprising a solid metal helical spring-like power transmitting element constricted about a central rubber cushion and an outer rubber cushion secured to said element having a protective jacket of interwoven strands secured to and movable therewith, the pitch of any given convolution of said element being materially less than the outside diameter of said spring-like element.

JOSEPH A. KENNEDY.